(12) United States Patent  
Andersson

(10) Patent No.: US 8,165,299 B2
(45) Date of Patent: Apr. 24, 2012

(54) NETWORK AUTHENTICATION

(75) Inventor: Stefan Andersson, Klågerup (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1179 days.

(21) Appl. No.: 11/261,177

(22) Filed: Oct. 28, 2005

(65) Prior Publication Data

US 2006/0053281 A1    Mar. 9, 2006

Related U.S. Application Data

(62) Division of application No. 09/928,491, filed on Aug. 14, 2001, now abandoned.

(60) Provisional application No. 60/226,895, filed on Aug. 23, 2000.

(30) Foreign Application Priority Data

Aug. 15, 2000    (GB) .................................. 0020095.6

(51) Int. Cl.
*H04L 9/00* (2006.01)
*H04L 9/12* (2006.01)

(52) U.S. Cl. ........................................... 380/270; 726/4

(58) Field of Classification Search .................. None
See application file for complete search history.

(56) References Cited

U.S. PATENT DOCUMENTS

| 5,280,527 A | 1/1994 | Gullman et al. |
| 5,623,637 A * | 4/1997 | Jones et al. ............... 711/164 |
| 5,668,876 A * | 9/1997 | Falk et al. ................... 380/271 |
| 5,778,071 A | 7/1998 | Caputo et al. |
| 5,784,463 A | 7/1998 | Chen et al. |
| 5,907,815 A | 5/1999 | Grimm et al. |
| 5,943,423 A | 8/1999 | Muftic |
| 6,041,409 A | 3/2000 | Zunquan |
| 6,061,346 A | 5/2000 | Nordman |
| 6,463,534 B1 | 10/2002 | Geiger et al. |
| 6,993,658 B1 * | 1/2006 | Engberg et al. ............... 713/185 |
| 2002/0104006 A1 * | 8/2002 | Boate et al. ................... 713/186 |
| 2002/0141586 A1 * | 10/2002 | Margalit et al. ............... 380/270 |
| 2004/0203800 A1 * | 10/2004 | Myhre et al. .................. 455/445 |
| 2008/0022381 A1 * | 1/2008 | Le Saint ............................ 726/9 |

FOREIGN PATENT DOCUMENTS

| DE | 19630920 C1 | 10/1997 |
| EP | 0898397 A2 | 2/1999 |
| GB | 2355151 A | 4/2001 |
| WO | WO 99/35553 | 7/1999 |

(Continued)

OTHER PUBLICATIONS

Chen, Shunxing et al., "WAP (Wireless Application Protocol)", Nov. 20, 1998, Helsinki University of Technology.*

(Continued)

*Primary Examiner* — Eleni Shiferaw
*Assistant Examiner* — Jeffery Williams
(74) *Attorney, Agent, or Firm* — Potomac Patent Group PLLC

(57) ABSTRACT

An existing communications device, such as a WAP-enabled mobile phone or other device, can be used as an authentication token. This has the advantage that WAP-enabled devices include components which are used in public key/private key cryptographic systems as a part of their standard communication functions. These components therefore advantageously allow the device to be used as an authentication token when communicating with a remote server.

12 Claims, 2 Drawing Sheets

FOREIGN PATENT DOCUMENTS

| WO | WO 00/25546 | 5/2000 |
| WO | WO 00/36566 | 6/2000 |
| WO | WO 00/45241 | 8/2000 |
| WO | WO 00/56105 | 9/2000 |
| WO | WO 00/59225 | 10/2000 |
| WO | WO 01/17310 A1 | 3/2001 |
| WO | WO 01/22760 | 3/2001 |

OTHER PUBLICATIONS

Borcherding, Malte, "Mobile Security—An Overview of GSM, SAT and WAP", 1999, Springer-Verlag Berlin Heidelberg, pp. 133-141.*

"Entity Authentication Using Public Key Cryptography", Federal Information Processing Standards Publication FIPS PUB 196 of Feb. 1997, U.S. Department of Commerce/National Institute of Standards and Technology.

Document on AU-System WAP Browser.

WAP Whitepaper from AU-System, Feb. 1999.

"Bluetooth—A Global Specification for Wireless Connectivity", Apr. 1999, Ericsson, p. 1.

Communication pursuant to Article 94(3) EPC, dated Dec. 8, 2010, in connection with Application No. 01 962 861.9-2416.

* cited by examiner

NETWORK AUTHENTICATION

CROSS REFERENCE TO RELATED APPLICATIIONS

This application is a divisional of U.S. application Ser. No. 09/928,491, filed Aug. 14, 2001, now abandoned which claims the benefit of U.S. Provisional Application No. 60/226,895, filed Aug. 23, 2000, which applications are hereby incorporated herein by reference in their entireties. This application further claims priority under 35 U.S.C. §§ 119 and/or 365 to 0020095.6 filed in The United Kingdom on Aug. 15, 2000, which is hereby incorporated herein by reference in its entirety.

TECHNICAL FIELD OF THE INVENTION

This invention relates to the field of computer security, and in particular to the authentication of a user over a computer network.

BACKGROUND OF THE INVENTION

It is desirable to be able to transmit confidential and personal information over unsecured public computer networks, such as the internet. To allow this, it is necessary to provide a secure registration system, which allows an individual user to have confidence that personal information transmitted over the network will remain confidential. Conversely, a service provider may wish to ensure that only some computer users are able to access specific information.

U.S. Pat. No. 5,784,463 describes a system in which a computer system is secured against authorized access, while date exchanged by a user with the computer system is encrypted when it is sent over the public network.

More specifically, U.S. Pat. No. 5,784,463 describes the use of an authentication token, which may be a hardware device or which may be a software module, which allows the user to authenticate himself to the remote computer. In this prior art system, shared secret keys provide mutual authentication between the two users. The shared secret keys are generated only at the time of registration, and are distributed using a public key/private key cryptographic system.

This system has the disadvantage that, before a computer user can take part in secure online transactions using the described system, he must obtain a separate authentication token. Further there is a cost associated with the distribution of such tokens, either to pay for the additional hardware, or to supply information for the software module.

SUMMARY OF THE INVENTION

In accordance with a preferred aspect of the invention, an existing communications device can be used as an authentication token.

In a preferred embodiment of the invention, a communications device which has a cryptographic module for use in mobile communications, can be used as an authentication token. For example, the device may be a device which can operate under the Wireless Application Protocol, that is, a WAP-enabled device, such as a mobile phone. This has the advantage that WAP-enabled devices include components which are used in public key/private key cryptographic systems as a part of their standard communication functions. These components therefore advantageously allow the device to be used as an authentication token when communicating with a remote server. Advantageously, the device can use Wireless Transport Layer Security (WTLS) for mobile communications, and employs its cryptographic module when in use as an authentication token.

It should be emphasised that the term "comprises/comprising" when used in this specification is taken to specify the presence of stated features, integers, steps or components but does not preclude the presence or addition of one or more other features, integers, steps, components or groups thereof.

DETAILED DESCRIPTION OF PREFERRED EMBODIMENTS

Figure 1:
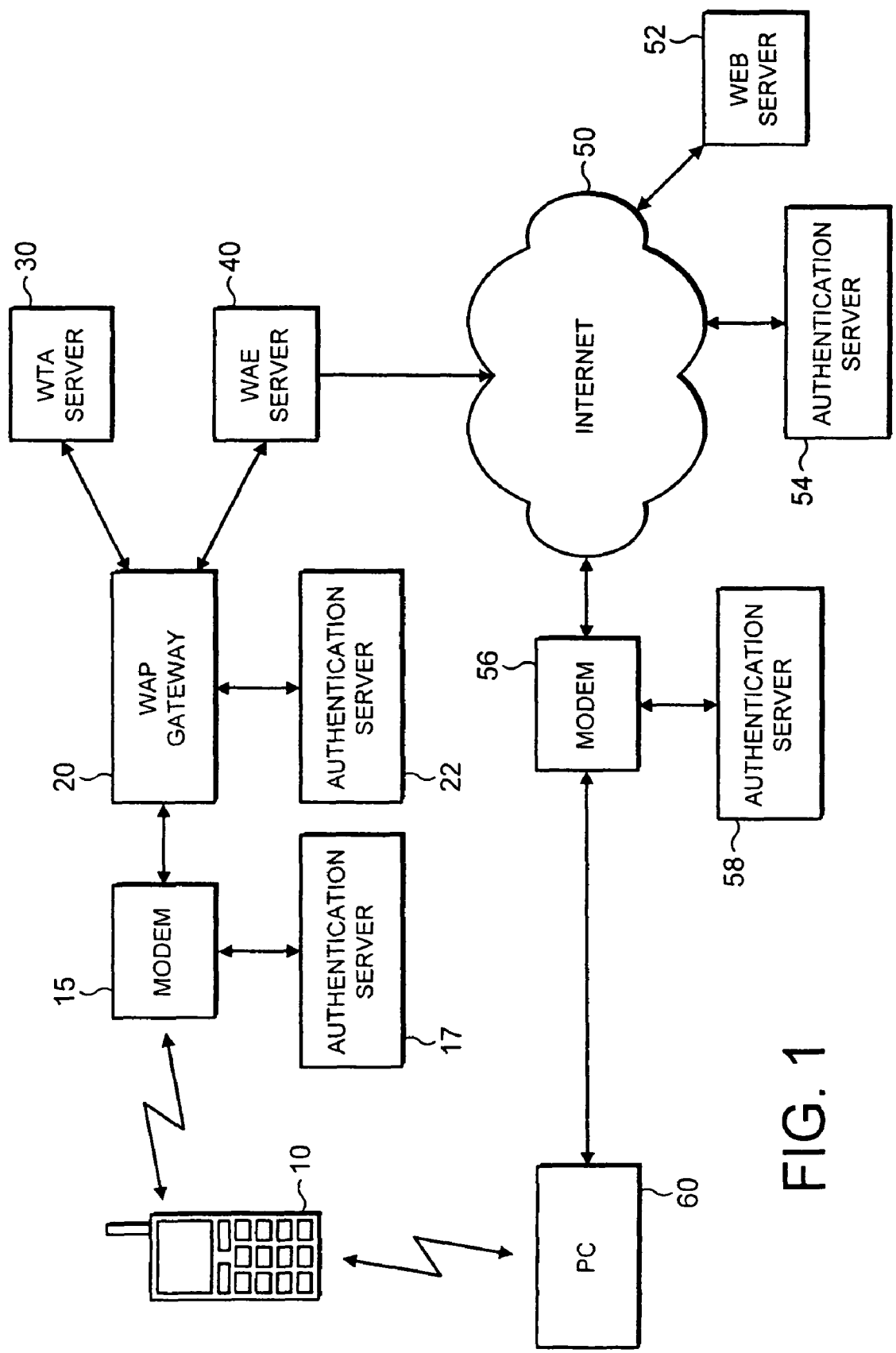
FIG. 1 is a schematic illustration of a network in which the present invention can be implemented.

FIG. 1 shows a system in accordance with the invention, which allows a user to communicate securely over the internet. As is conventional, the user has a WAP-enabled device, for example, a mobile phone 10. The mobile phone 10 communicates over a wireless interface through a wireless modem 15 with a WAP Gateway 20. The WAP Gateway 20, for example, converts signals between different protocols used over the wireless network and over the wired networks which are involved.

As an example, the WAP Gateway 20 has an interface for connection to a Wireless Telephony Application (WTA) server 30, which provides telephony-related functions, such as handling voice calls or text messages.

One specific use of WAP-enabled devices is to access the internet, and in particular to access the information on web pages which are specifically designed for that purpose.

Thus, the WAP Gateway 20 also includes an interface for connection to a Wireless Applications Environment (WAE) server 40. The WAE server 40 is in turn connected to the internet 50. Data which may be accessed by a WAP-enabled device are stored on a web server 52. As is well known, the internet is made up of very many servers of this type, storing such information.

As is known, content on web pages which are intended to be accessed by web-enabled devices is conventionally written using Wireless Markup Language (WML), a language which is designed to meet the constraints which typically apply in this environment, namely the relatively low bandwidth available in the wireless interface, and the generally small available display sizes on the handheld WAP-enabled devices such as mobile phones.

In order to enhance services written in WML, a scripting language WMLScript, can be used.

In order to provide security between the WAP-enabled client device 10 and the WAP Gateway 20, Wireless Transport Layer Security (WTLS) can be used. This provides confidentiality for users, by encrypting messages which are transmitted over the wireless interface, and also provides authentication, by means of digital certificates.

In order to provide this WTLS functionality, the WAP-enabled device 10 includes a cryptographic module, which uses an embedded public key and private key on handshake for authentication, then generates symmetric session keys, which are used to encode messages before transmission and to decode received messages, For example, the cryptographic module can be realised in hardware or in software in the phone 10, or may be provided on an external smart card, or the phone 10 may also include a Wireless Identity Module (WIM) card, which is used to identify the subscriber.

In accordance with preferred embodiments of the present invention, the cryptographic module of the phone, and other features which are used to provide secure communication using the Wireless Application Protocol, also allow the phone 10 to be used as an authentication token for other communications.

In the case where the cryptographic module is embodied in hardware, the necessary information is provided on an integrated circuit in the device. Where the Wireless Public Key Infrastructure (WPKI) is used to distribute the parameters for WTLS, it can also be used to distribute the parameters required for use as an authentication token.

When communicating in the WAP environment, for example, authentication can take place at the WAP Gateway 20 using the device 10 as an authentication token, and can also take place at the modem 15 and/or at the web server 52. Thus, the modem can have an associated authentication server 17, the WAP Gateway can have an associated authentication server 22, and a web server 52 can have an associated authentication server 54. The authentication server 54 associated with a web server 52 can be directly connected thereto, or (as shown in FIG. 1) can be connected thereto over the internet.

Carrying out additional authentications in this way can provide additional security. In addition, using the device as an authentication token to carry out authentications at the WAP Gateway avoids the need for the user to enter a password, which increases the convenience for the user.

Figure 2:
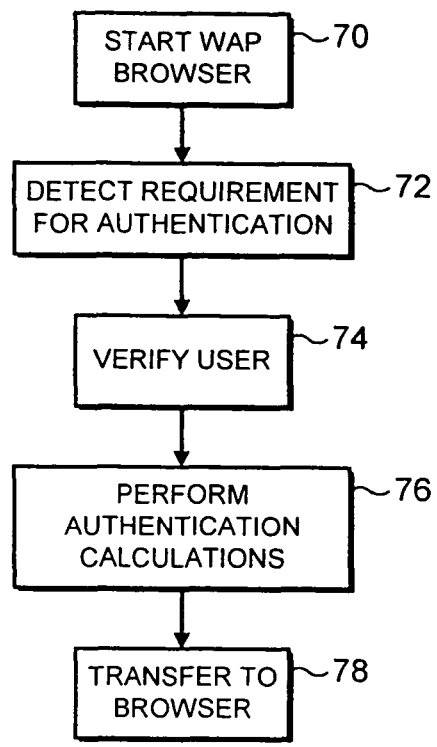
FIG. 2 is a flow chart showing a first authentication method in accordance with the invention.

FIG. 2 shows the operation of the device 10 as an authentication token in the WAP environment. This operation will be described here with reference to a situation in which the device 10 is authenticated to the authentication server 17 associated with the modem 15. However, as mentioned above, authentication can take place in a similar way at many points in the network.

At step 70, the user starts the WAP browser software in the device 10, and attempts to communicate through the modem 15. In this case, the modem 15 requires authentication, and the device 10 detects this requirement at step 72.

At step 74, the device verifies the identity of the user. As part of this procedure, the device gives a prompt to the user, asking the user to identify himself. One possibility is to require the user to enter a Personal Identification Number (PIN). However, to provide an additional layer of security, the device 10 can also use a form of biometrics to provide user authentication. Thus, for example, the device 10 can include means for examining a physical feature which uniquely or nearly uniquely identifies a user, such as his fingerprints or voice recognition or another biometric technique, and allowing the user access to the system only if that physical feature is found to match the intended user.

Once the user has authenticated himself to the token, the token can authenticate itself to the modem 15, at step 76. Thus, using a selected authentication protocol, the token performs the necessary calculations, and, at step 78, information is provided to the WAP browser software, for example allowing it to respond to challenges from the authentication server 17, or to generate a password based on offline information.

More details about an authentication protocol which may be used can be found in the document "Entity Authentication Using Public Key Cryptography", Federal Information Processing Standards Publication FIPS PUB 196 of February 1997.

Such an authentication procedure may be used in the WAP environment in many situations. For example, the user may use the device 10 to authenticate himself to a bank machine, or to a further device which controls access to a building or area.

In an alternative embodiment of the invention, the device 10 can be used as an authentication token when a user wishes to access the internet 50 using a personal computer 60.

As is well known, a personal computer has the advantage, compared with current mobile devices, that it has a wider range of input options (such as a full size keyboard and a mouse), and has a larger display for retrieved data. Further, the personal computer 60 is provided with a wired broadband connection to the internet 50. Possible uses of a personal computer 60, in conjunction with the internet 50, include retrieving data from servers to which there is intended to be restricted access, and carrying out online transactions, which may include transmitting confidential user information to a third party computer. As described above, the third party computer, from which information is to be retrieved, or to which information is to be transmitted, has an associated authentication server 54.

Also, FIG. 2 shows the PC connected to the internet 50 through a modem 56, which has an associated authentication server 58. The description below refers to authentication towards the authentication server, but the same procedure can be used to authenticate towards the authentication server 58.

Secure communications between the personal computer 60 and the authentication server 54 can then be achieved using an authentication token, as is generally known. In accordance with the invention, the authentication token can use the cryptographic components of a device, which also uses those components in, for example, WTLS communications.

Figure 3:
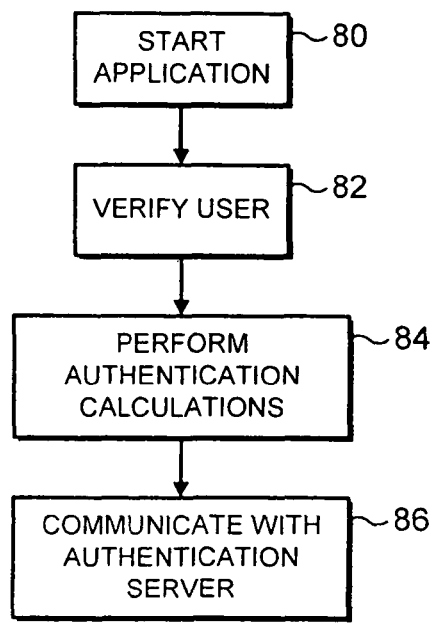
FIG. 3 is a flow chart showing a second authentication method in accordance with the invention.

FIG. 3 shows the operation of the device 10 as an authentication token in conjunction with the PC 60.

At step 80, the user starts the application which requires authentication, and the authentication functionality of the device 10 is started.

At step 82, the device verifies the identity of the user. As described with reference to FIG. 2, the user may be required to enter a Personal Identification Number (PIN), while, to provide an additional layer of security, the device 10 can also use a form of biometrics to provide user authentication.

Once the user has authenticated himself to the token, the token can authenticate itself to the web server, at step 84. Using the selected authentication protocol, the token performs the necessary calculations to generate the required passwords, and, at step 86, information is sent to the authentication server 54.

Again, a suitable authentication protocol is described in the document "Entity Authentication Using Public Key Cryptography", Federal Information Processing Standards Publication FIPS PUB 196 of February 1997.

In outline, when the user first contacts the authentication server 54, the authentication server issues a challenge to the user. The authentication token encrypts the challenge with the user's private key, and returns it to the authentication server. The returned challenge is then decrypted by the authentication server with the user's public key, and the authentication server verifies that the decrypted challenge is the same as the original challenge.

Thus, there is no requirement for a user to enter a password to be able to access confidential information which is on the authentication server 54. The necessary password can in effect be generated automatically by the WAP-enabled device 10, using the public key infrastructure provided by the cryptographic module of the device, on the basis of the identity of the user confirmed by the wireless identity module in the device.

In this way, the WAP-enabled device 10 can be used an authentication token for multiple authentication servers, including authentication servers from multiple manufacturers. All that is necessary is for an authentication server and the device 10 to be able to operate the same authentication protocols.

It will be appreciated that, for example with appropriate software in the device, it can use any suitable authentication algorithm. The cryptographic module in the device can be used in any suitable method for generating passwords and encrypting communications, although use of Wireless Public Key Infrastructure is preferred.

The WAP-enabled device allows the use of digital signatures, for the purposes of non-repudiation. This same functionality can also be re-used when the device is being used as an authentication token.

In the case where the device 10 is used as an authentication token for a personal computer, described above with reference to FIG. 3, there is preferably a connection between the personal computer 60 and the WAP-enabled mobile phone 10. The connection may be wired, or, advantageously, communications between the personal computer 60 and mobile phone 10 can take place using the Bluetooth short-range radio transmission protocol.

When there is a connection between the personal computer 50 and the WAP-enabled mobile phone 10, whether this is wireless or wired, and the personal computer requires to use the phone 10 as an authentication token, this functionality of the phone must be started. This can be carried out automatically by means of a specific command sent from the personal computer to the phone, and may alternatively or additionally be carried out in response to a specific keypress on the keyboard of the phone.

When used with a personal computer in this way, commands may be transferred to and from the device using the AT protocol. Thus, for example, passwords which are generated in the mobile phone 10 acting a the authentication token are transferred to the personal computer 60, and can be automatically sent to the authentication server.

However, a manual operation is also possible, in which the necessary authentication calculations are carried out in the authentication token, and the required password or passwords are displayed on a screen of the device, and can be manually entered by the user through the keyboard of the personal computer, and can then be sent to the authentication server.

There is thus disclosed an authentication token which is readily available, since it re-uses functionality and infrastructure which already exist for WAP-enabled devices.

The invention claimed is:

1. A method of operating a mobile communications device that includes a cryptographic module, the method comprising:
   detecting whether communication with a service node via a wireless network should be performed and if so then performing:
      detecting whether the service node accessed by the mobile communications device via the wireless network requires performance of an authentication, and in response to detecting that the service node accessed by the mobile communications device via the wireless network requires performance of the authentication, using the cryptographic module to carry out the authentication; and
      if the authentication is successfully carried out then communicating with the service node via the wireless network and interacting with the service node to exchange data content of relevance to the service node; and
   detecting whether a local external device having a connection to a network by means other than the mobile communications device requires performance of an authentication, and in response to detecting that the local external device requires performance of the authentication, using the cryptographic module to carry out the authentication.

2. The method of claim 1, wherein the mobile communications device is a Wireless Application Protocol (WAP)-enabled device.

3. The method of claim 2, wherein the cryptographic module is implemented in a Wireless Identity Module (WIM).

4. The method of claim 2, wherein each of the authentications is carried out in accordance with Wireless Public Key Infrastructure.

5. The method of claim 1, wherein communications between the mobile communications device and the local external device take place via a wired connection.

6. The method of claim 1, wherein communications between the mobile communications device and the local external device take place via a wireless connection.

7. A mobile communications device comprising:
   means for communicating with a service node via a wireless network and interacting with the service node to exchange data content of relevance to the service node;
   a tangible cryptographic module;
   means for detecting whether the service node accessed by the mobile communications device via the wireless network requires performance of an authentication, and in response to detecting that the service node accessed by the mobile communications device via the wireless network requires performance of the authentication, using the cryptographic module to carry out the authentication; and
   means for detecting whether a local external device having a connection to a network node by means other than the mobile communications device requires performance of an authentication, and in response to detecting that the local external device requires performance of the authentication, using the cryptographic module to carry out the authentication,
   wherein the service node may or may not be the same as the network node.

8. The mobile communications device of claim 7, wherein the mobile communications device is a Wireless Application Protocol (WAP)-enabled device.

9. The mobile communications device of claim 8, wherein the cryptographic module is implemented in a Wireless Identity Module (WIM).

10. The mobile communications device of claim 8, wherein each of the authentications is carried out in accordance with Wireless Public Key Infrastructure.

11. The mobile communications device of claim 7, comprising:
   means for communicating with the local external device via a wired connection.

12. The mobile communications device of claim 7, comprising:
   means for communicating with the local external device via a wireless connection.

* * * * *

UNITED STATES PATENT AND TRADEMARK OFFICE
CERTIFICATE OF CORRECTION

| | | |
|---|---|---|
| PATENT NO. | : 8,165,299 B2 | Page 1 of 1 |
| APPLICATION NO. | : 11/261177 | |
| DATED | : April 24, 2012 | |
| INVENTOR(S) | : Stefan Andersson | |

It is certified that error appears in the above-identified patent and that said Letters Patent is hereby corrected as shown below:

In Column 2, Line 67, delete "messages," and insert -- messages. --, therefor.

In Column 5, Line 40, delete "a the" and insert -- as the --, therefor.

Signed and Sealed this

Fourth Day of September, 2012

David J. Kappos
*Director of the United States Patent and Trademark Office*